(12) United States Patent
Just

(10) Patent No.: US 7,448,667 B2
(45) Date of Patent: Nov. 11, 2008

(54) SPRING CLIP FOR USE IN A CONVERTIBLE TOP HAVING SIDE TENSION CABLES

(75) Inventor: Jan Just, Bloomfield Hills, MI (US)

(73) Assignee: Magna Car Top Systems GmbH, Rochester Hills, MI (US)

( * ) Notice: Subject to any disclaimer, the term of this patent is extended or adjusted under 35 U.S.C. 154(b) by 217 days.

(21) Appl. No.: 10/598,270

(22) PCT Filed: Feb. 28, 2005

(86) PCT No.: PCT/US2005/006523

§ 371 (c)(1),
(2), (4) Date: Aug. 23, 2006

(87) PCT Pub. No.: WO2005/084981

PCT Pub. Date: Sep. 15, 2005

(65) Prior Publication Data

US 2007/0170747 A1  Jul. 26, 2007

Related U.S. Application Data

(60) Provisional application No. 60/548,621, filed on Feb. 27, 2004.

(51) Int. Cl.
*B60J 7/12*  (2006.01)

(52) U.S. Cl. .............................. 296/107.12; 296/107.11; 296/121

(58) Field of Classification Search ................. 296/116, 296/117, 118, 121, 107.04, 107.09, 107.11, 296/107.12, 108, 122

See application file for complete search history.

(56) References Cited

U.S. PATENT DOCUMENTS

| | | | | |
|---|---|---|---|---|
| 2,482,323 | A | * | 9/1949 | Cromwell et al. ........ 296/107.12 |
| 3,075,804 | A | * | 1/1963 | Geiger et al. ........... 296/107.12 |
| 3,167,349 | A | | 1/1965 | Young et al. |
| 3,266,838 | A | * | 8/1966 | Heincelman ................. 296/121 |
| 3,425,742 | A | * | 2/1969 | Rauber, Jr. ................... 296/121 |
| 4,778,215 | A | * | 10/1988 | Ramaciotti .............. 296/107.07 |
| 5,031,957 | A | * | 7/1991 | Claar et al. ................... 296/108 |
| 5,253,915 | A | | 10/1993 | Schnader et al. |
| 5,267,770 | A | | 12/1993 | Orth et al. |
| 6,022,064 | A | | 2/2000 | Robbins et al. |
| 6,209,945 | B1 | | 4/2001 | Aydt et al. |
| 6,237,986 | B1 | | 5/2001 | Neubrand et al. |
| 6,322,137 | B1 | | 11/2001 | Munsters |
| 6,325,446 | B1 | * | 12/2001 | Wuellrich et al. ....... 296/107.12 |
| 6,328,372 | B1 | * | 12/2001 | Just ........................ 296/107.12 |
| 6,416,111 | B1 | | 7/2002 | Neubrand |
| 6,499,793 | B2 | | 12/2002 | Heselhaus et al. |
| 6,796,596 | B2 | * | 9/2004 | Fischer .................. 296/107.12 |
| 7,152,904 | B2 | * | 12/2006 | Bogenschuetz et al. 296/107.12 |
| 2003/0146642 | A1 | | 8/2003 | Mandl et al. |
| 2007/0138827 | A1 | * | 6/2007 | Schonhorst et al. ..... 296/107.02 |
| 2007/0205630 | A1 | * | 9/2007 | Hollenbeck ............ 296/107.04 |

* cited by examiner

*Primary Examiner*—Jason S Morrow
(74) *Attorney, Agent, or Firm*—Brooks Kushman P.C.

(57) ABSTRACT

A one piece rod spring clip is attached to a tensioning cable in a convertible top. The rod spring clip (40) includes a leg that is aligned with an end of the cable. The rod spring clip is secured to the one bow (38) of the convertible top and applies a biasing force to the end of the cable through the action of a flexure portion of the rod spring clip that applies an axial force to the cable.

14 Claims, 2 Drawing Sheets

SPRING CLIP FOR USE IN A CONVERTIBLE TOP HAVING SIDE TENSION CABLES

CROSS-REFERENCE TO RELATED APPLICATION

This application claims the benefit of U.S. provisional application Ser. No. 60/548,621, filed Feb. 27, 2004.

BACKGROUND OF THE INVENTION

1. Field of the Invention

The present invention relates to convertible tops having tensioning cables that apply tension to the convertible top cover.

2. Background Art

Convertible tops can include tensioning cables that apply tension to a top cover when a top stack is in its closed position. Such tensioning cables provide a smooth, snug fit between the top cover and various vehicle components that it spans and encloses, such as a windshield frame, side window frames, and the supporting top stack frame. This smooth, snug fit is preferred because it provides an aesthetically pleasing appearance while also limiting gaps and leakage paths into a passenger area.

The tensioning cables are hidden under the top in a pocket or other enclosure and run along side support rails to fit the top against the rails. The tensioning member interconnects the cable to a one bow of the top. The one bow member is moved by the top stack as it travels from its opened, or retracted, position in a storage compartment at the rear of the vehicle to its closed, or extended, position. As the top stack is extended, the cable is straightened by the tensioning member pulling the cable to flatten the top cover providing a smooth, snug fit to the vehicle.

Prior to the present invention, tensioning members typically included a helical spring that required multiple connections to the one bow and the cable. A disadvantage of these multiple connecting point helical spring tensioning members is that they are difficult to assemble. Multiple steps are required in the manufacturing process to connect each end of the tensioning member. Multiple parts must be fabricated and assembled to form the tensioning members resulting in higher part counts.

For example, if the tensioning member includes a helical spring, catches or loops may be required at either end that latch into the front-support and cable. Multiple steps are required to secure the catches to the helical springs and cable ends. This process can be time consuming and requires that an assembler take time to assemble the catches. A relatively high degree of precision is required to assemble the parts, especially due to the relatively small size of the parts.

Additional fasteners may be required to secure the tensioning member to the one bow and cable. For example, a screw or other similar fastener is typically required to connect the tensioning member to the top stack. The additional parts and additional manufacturing steps required to attach the tensioning member to the one bow and cable adds to the cost of the convertible top.

As vehicle manufacturers are becoming more cost conscious, the are also demanding less complex manufacturing processes. There is a need to provide a member for tensioning the top cover cable that reduces the complexity and cost of convertible tops.

SUMMARY OF THE INVENTION

According to one aspect of the present invention, a convertible top for a vehicle having a windshield header is provided. The convertible top comprises a flexible fabric cover having at least one pocket formed about a portion of the perimeter of the cover. At least one cable is disposed in the pocket and each cable has an anchoring end. Generally, two cables are provided with one cable on each side of the cover. A spring clip has a first leg that is secured to the anchoring end of the cable that is in axial alignment with the end of the cable. A one bow is selectively secured to the windshield header when the convertible top is in an extended position. The spring clip is connected to the one bow and has a flexure portion that applies a biasing force to the end of the cable pulling the cable axially towards the windshield header when the convertible top is in the extended position.

According to other aspects of the invention, the spring clip may be a one-piece rod spring clip having a hook that is secured to the one bow and wherein the flexure portion is a transversely extending length of the rod spring clip that extends between the hook and the first leg. The rod spring clip may include a U-shaped portion that is disposed between the hook and the flexure portion. The one bow may define a receptacle that receives the U-shaped portion of the rod spring clip. The spring clip may be secured to an opening in the one bow.

According to another aspect of the invention, a spring attachment clip for a cable of a convertible top cover that is secured to a one bow of a top stack is provided. The spring attachment clip comprises a leg attached to an end of the cable in axial alignment with the end of the cable. A retainer is integrally formed on the spring attachment clip and is received by the one bow. A spring portion is formed in the clip between the retainer and the leg that provides a biasing force on the cable to tighten the cable when the top stack is in an extended position. The spring portion of the clip is not a helical spring.

According to other aspects of the invention as they relate to the spring attachment clip, the spring attachment clip is a rod spring clip and the retainer is a hook that is secured to the one bow. The spring portion is a transversely extending length of the rod spring clip that extends between the hook and the leg that is attached to the end of the cable. The rod spring clip may include a U-shaped portion that is disposed between the hook and the spring portion. The one bow may define a receptacle that receives the U-shaped portion of the rod spring clip. The rod spring clip may include a retainer that is formed as a hook to be secured to an opening in the one bow.

The above aspects and other aspects, features, and advantages of the present invention are readily apparent from the following detailed description of the best mode for carrying out the invention when taken in connection with the accompanying drawings.

DETAILED DESCRIPTION OF THE ILLUSTRATED EMBODIMENT

Figure 1:
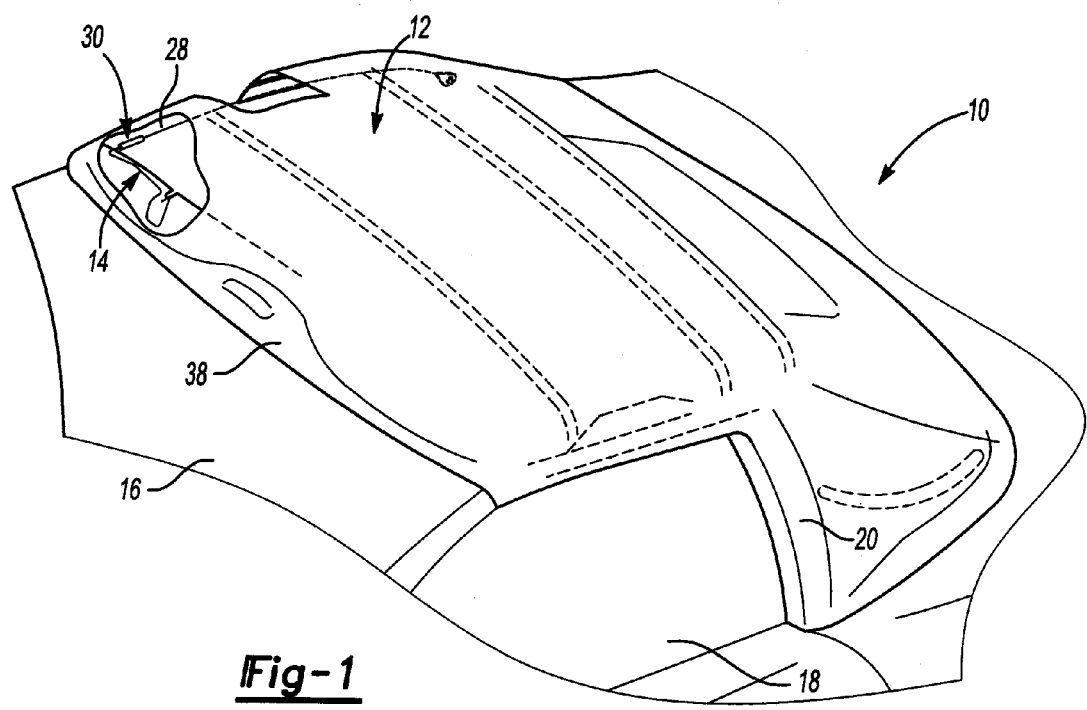
FIG. 1 is a fragmentary perspective view of a convertible top in its extended position on a vehicle.

FIG. 1 illustrates a partial top view of a vehicle 10 having a convertible top 12. The vehicle 10 corresponds to any vehicle that may include the convertible top 12. The convertible top 12 is used with a vehicle having a windshield 16, at least one side window 18 on each side, and one or more support pillars 20 that support the windshield 16 and windows 18.

The convertible top 12 can be any type of convertible top that can be opened to expose a passenger area and closed to cover the passenger area, or other areas of the vehicle, such as a truck bed. The convertible top 12 can include non-rigid, semi-rigid, or rigid materials, such as a canvas, cloth, plastic, metal, or an alloy or composite of the same.

Preferably, the top 12 includes a tensioning cable 28 on both sides of the vehicle 10 to provide a smooth, snug fit between the top 12 and the support rails that it covers. This smooth, snug fit is generally preferable because it provides an aesthetically pleasing appearance while also limiting gaps and water leakage paths into a passenger area.

Preferably, the tensioning cable 28 is hidden under the top 12 in a pocket, or other enclosure, 30 and runs along side support rails from a leading to a trailing end of the top 12. The pocket 30 may be seen in the fragmentary cross-section shown in FIG. 1.

In accordance with the present invention, a tensioning member 34 is provided to connect the cable 20 to a one bow 38 of the top 12. The tensioning member 34 provides a tensioning force that pulls on the cable 18 when the top 12 is closed. The pulling action tightens the cable 18 flatten out the top 12 to establish a smooth, snug relationship with the support rails.

Figure 2:
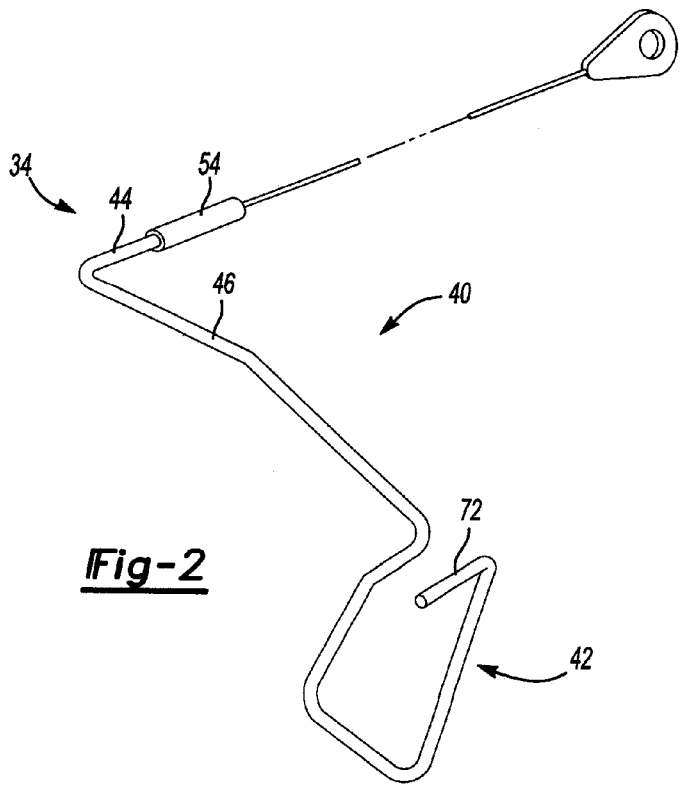
FIG. 2 is a perspective view of a rod spring and cable assembly made according to one embodiment of the present invention.

FIG. 2 illustrates the tensioning member 34 of the present invention in more detail. This arrangement is generally referred to as a U-shaped rod spring clip 40. The rod spring clip 40 includes a clip portion 42, an elbow 44, a longitudinal portion 46, and a U-shaped portion 48 which together provide tensioning force that is applied to the cable 28.

The tensioning member 34 is connected at one end to the cable 18 by a crimped cylindrical sleeve 54. The cylindrical sleeve 54 is an inexpensive connector that can quickly and securely connect to the rod spring clip 40 to the cable 18. Other connectors could similarly be used without deviating from the present invention.

Alternatively, the rod spring clip 40 could include a catch, loop, or other item that can be latched to, tied to, or otherwise fastened to the cable. Such devices may be slightly more labor intensive to attach, but would not deviate from the broad scope of the present invention. The installation of the tensioning member 34 of the present invention with such alternative arrangements would still be relatively less complex than the prior art devices.

The tensioning member 34 comprises a suitable resilient material, such as a plastic, metal, alloy, or other composition that allows it to maintain a predefined shape while at the same time being sufficiently resilient and capable of providing adequate tension. The configuration shown in FIG. 2 is one example of a preferred configuration, but other configurations, shapes, and features also may be incorporated in the present invention.

The embodiment shown in FIG. 2 provides a tensioning member 34 that reduces manufacturing complexity and reduces the cost in comparison to the prior art. In particular, the present invention provides a simplified solution which is easier to assemble and decreases manufacturing costs.

The installation may be performed by a robot or other automatic assembly tool. The tensioning member can be manually assembled or automatically assembled because the installation is relatively simple and does not require intricate manipulations to install. However, manual assembly techniques could also be used to install the tensioning member 34 with relative ease.

Figure 3:
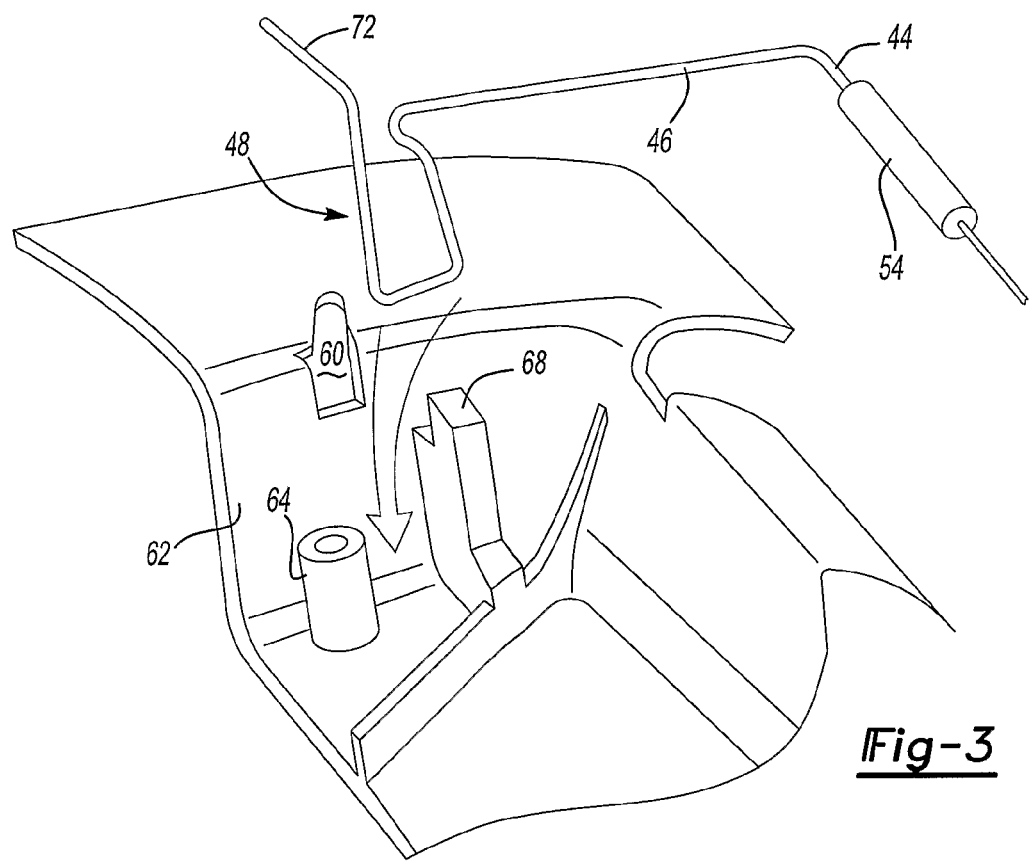
FIG. 3 is a fragmentary perspective view showing a rod spring and cable ready to be assembled to a one bow of the convertible top.
Figure 4:
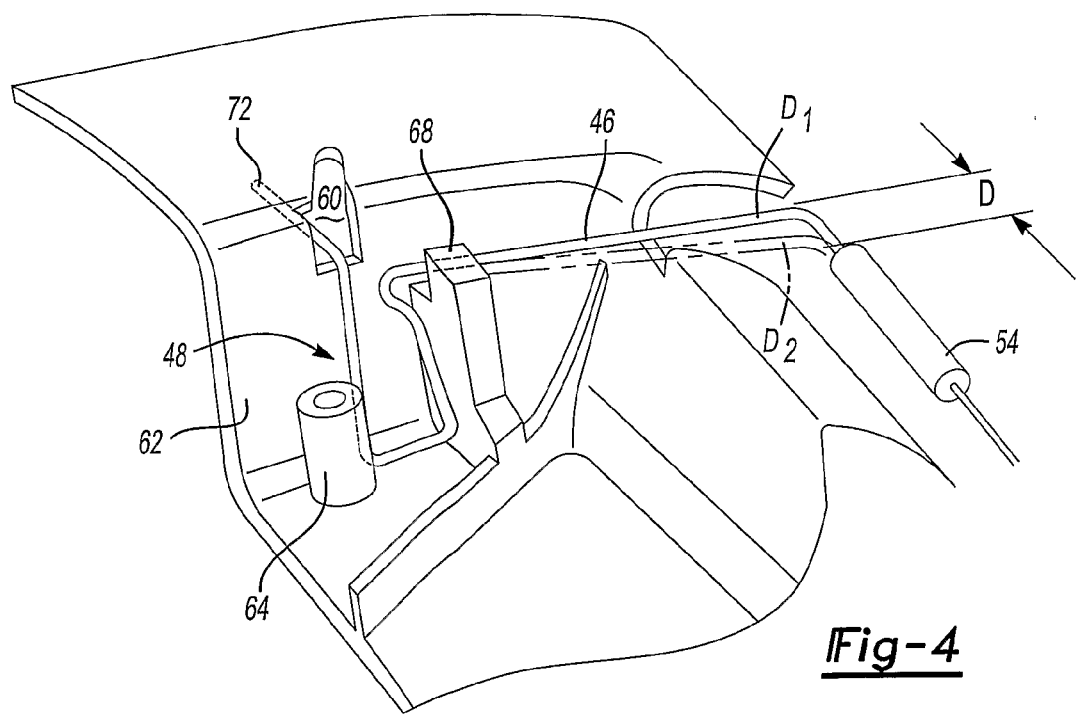
FIG. 4 is a fragmentary perspective view of a rod spring and cable assembled to the one bow of a convertible top.

As shown in FIGS. 3 and 4, the tensioning member 34 can be easily inserted into and secured to the one bow 38. The present invention may eliminate screws or other fastening devices to attach the tensioning member 34 to the one bow 38.

The one bow 38 preferably includes molded positioning members into which the tensioning member 34 can be easily inserted. The positioning members support portions of the rod spring clip 40 allowing the clip 40 to tension the cable 28. The one bow 38 includes a relief cut out 60, a side wall 62, a pin 64, and a catch 68. Together, these elements cooperate with the tensioning member 34 to tension the cable 28. The one bow is molded in a Thixomolding® process wherein a magnesium alloy or other lightweight and durable material is injection molded in a thixotropic state in one step. The relief cut out 60, side wall 62, pin 64, and catch 68 may all be integrally formed to net size and shape in the Thixomolding® process.

Referring back to FIG. 2, it can be seen that the U-shaped portion 48 extends below the longitudinal portion 46 to define its U-shape. The U-shaped portion 48 is fitted between the front support side wall 62 and the pin 64 and extends partially around the catch 68. The U-shaped portion 46 deflects resiliently about the catch 68 to tension the cable 28. This allows the U-shaped portion 46 to tension the cable 28 against the side wall 62 and the catch 68.

A prong 72 is provided on the rod spring clip 40 that extends generally perpendicularly relative to the longitudinal portion 46 and is inserted through the front support member relief cut out 60. The prong 72 biases the tensioning member 34 against lifting out of its position between the side wall 62 and the pin 64. In addition, the catch 68 can be oriented at an acute angle to further limit disengagement of tensioning member 34.

The tensioning member 34 is assembled to the one bow 38 in a two-step process. The first step is to crimp the tensioning member 34 to the cable, The second step is to simultaneously position the U-shaped portion 48 between the side wall 62, pin 64, while positioning the prong 72 in the relief 60. The longitudinal portion 46 is inserted within the latch support 68.

Once positioned, the resiliency of the tensioning member 34 allows it to move from position D1 to position D2 over a distance D. To move from distance D1 to D2, tensioning force is applied by the cable 28 that pulls on the tensioning member 34. The tensioning force is applied to the cable 28 as the top 12 is moved from its folded position to its closed position.

The length at the cable 28 is selected such that the cable 28 begins to tug on the tensioning member 34 just before the front-support member, or one bow 38, closes. The rod spring clip 40 pulls the cable 28 causing the cover top 12 to flatten the top 12 providing the desired smooth, snug fit between the top 12 and the vehicle 10 once the top closes.

The tensioning force is provided by the rod spring clip 40 interacting with one bow 38. The present invention, however, is not limited to these particular configurations and arrangements.

Alternatively, additional parts or few parts and features could be included on the one bow 38 to support and tension the rod spring clip 40 as needed. Moreover, the tensioning member 34, or rod spring clip 40, could include other configurations and shapes such that it could be designed to comport with design and spacing limitations of the front support member, or one bow 38. This design flexibility allows the invention to be adapted to other convertible top designs.

For example, the latch support 68 could be offset laterally from the side wall 62 and the pin 64 to change the tension on the cable 28 by changing the leveraging point of the longitudinal portion 46. Moreover, the U-shaped portion 48 can be eliminated in favor an L-shaped configuration in which the prong 72 lies in the same plane as the longitudinal portion 46. The need for the pin 64 could be eliminated if the rod spring clip 40 is provided without the U-shaped portion.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A convertible top for a vehicle having a windshield header, the convertible top comprising:
    a flexible fabric cover having at least one pocket formed about a portion of the perimeter of the cover;
    at least one cable disposed in the pocket, each cable having an anchoring end;
    a spring clip having a first leg that is secured to the anchoring end of the cable in axial alignment with the end of the cable;
    a one bow that is selectively secured to the windshield header when the convertible top is in an extended position; and
    wherein the spring clip is connected to the one bow and has a flexure portion that applies an axial biasing force to the end of the cable pulling the cable towards the windshield header when the convertible top is in the extended position.

2. The convertible top of claim 1 wherein the spring clip is a rod spring clip having a hook that is secured to the one bow and the flexure portion is a transversely extending length of the rod spring clip that extends between the hook and the first leg.

3. The convertible top of claim 2 wherein the rod spring clip includes a U-shaped portion that is disposed between the hook and the flexure portion.

4. The convertible top of claim 3 wherein the one bow defines a receptacle that receives the U-shaped portion of the rod spring clip.

5. The convertible top of claim 1 wherein the spring clip is a rod spring clip having a hook that is secured to an opening in the one bow.

6. A spring attachment clip for a cable of a convertible top cover that is secured to a one bow of a top stack, the spring attachment clip comprising:
    a leg attached to a cable end in axial alignment with an end of the cable;
    a retainer integrally formed on the spring attachment clip that is received by the one bow; and
    a spring portion formed in the clip between the retainer and the leg that provides a biasing force on the cable to tighten the cable when the top stack is in an extended position, wherein the spring portion is not a helical spring.

7. The spring attachment clip of claim 1 wherein the spring attachment clip is a rod spring clip and the retainer is a hook that is secured to the one bow and the spring portion is a transversely extending length of the rod spring clip that extends between the hook and the leg that is attached to the end of the cable.

8. The spring attachment clip of claim 7 wherein the rod spring clip includes a U-shaped portion that is disposed between the hook and the spring portion.

9. The spring attachment clip of claim 8 wherein the one bow defines a receptacle that receives the U-shaped portion of the rod spring clip.

10. The spring attachment clip of claim 6 wherein the spring clip is a rod spring clip and the retainer is a hook that is secured to an opening in the one bow.

11. The spring attachment clip of claim 6 wherein the spring clip is attached to the cable by a sleeve crimp connector.

12. A convertible top for a vehicle having a windshield header, the convertible top comprising:
    a flexible fabric cover having at least one pocket formed about a portion of the perimeter of the cover;
    at least one cable disposed in the pocket, each cable having an anchoring end;
    a spring clip formed in one piece from a rod to have a first leg that is secured to the anchoring end of the cable to apply a tensioning force to the end of the cable, the spring clip also being formed to have a clip portion;
    a support member that is selectively secured to the windshield header when the convertible top is in an extended position; and
    wherein the spring clip is connected to the support member and wherein the spring clip is resilient and has a portion disposed between the anchoring end and the clip portion that applies an axial tensioning force to the end of the cable pulling the cable towards the windshield header when the convertible top is in the extended position.

13. The convertible top of claim 12 wherein the portion of the spring clip that applies a tensioning force to the end of the cable includes a U-shaped portion and a transversely extending portion that are disposed between the clip portion and the anchoring end.

14. The convertible top of claim 13 wherein the support member defines a receptacle that receives the U-shaped portion of the rod spring clip to locate the clip portion relative to the transversely extending portion on the supporting member.

* * * * *